United States Patent [19]
Fox et al.

[11] 3,930,891
[45] Jan. 6, 1976

[54] PILOT BURNER THERMOCOUPLE APPARATUS

[75] Inventors: Donnell H. Fox, Newport Beach, Calif.; Charles Matilo, North Olmsted, Ohio

[73] Assignee: Robertshaw Controls Company, Richmond, Va.

[22] Filed: Nov. 26, 1973

[21] Appl. No.: 419,226

[52] U.S. Cl. ................ 136/217; 136/242; 431/80
[51] Int. Cl.² ........................................ G01K 7/02
[58] Field of Search ............... 136/217, 242; 431/80

[56] References Cited
UNITED STATES PATENTS
3,290,178  12/1966  Loveland ........................ 136/242
3,650,843  3/1972  Kenyon ........................... 136/217

*Primary Examiner*—Verlin R. Pendegrass
*Attorney, Agent, or Firm*—Fulwider, Patton, Rieber, Lee & Utecht

[57]  ABSTRACT

Thermocouple apparatus for attachment to a pilot gas burner. A thermocouple has a mounting portion. An adaptor is mounted thereon engageable with a pilot burner bracket. The adaptor and the thermocouple mounting portion are yieldably restrained against relatively sliding movement to permit adjustment of the thermocouple body relative to the burner flame. The thermocouple is readily removeable from the adaptor for replacement even where the flame-engaging portion of the thermocouple has expanded.

2 Claims, 4 Drawing Figures

PILOT BURNER THERMOCOUPLE APPARATUS

BACKGROUND OF THE INVENTION

1. Field of the Invention

This invention relates to gas-fired burners and a thermocouple control therefor.

2. Description of the Prior Art

The prior art, as exemplified by U.S. Pat. Nos. 3,522,107; 3,620,849 and 3,709,740, recognizes the desirability of properly orienting a thermocouple with respect to the flame issuing from a pilot burner by means of adaptor members. Those patents disclose satisfactory arrangements which permit ready installation of a thermocouple in a minimum amount of time and without requiring any special tools. Difficulty in removing a defective thermocouple can arise, however, where the flame-engaging portion thereof becomes expanded relative to its initial configuration. Under such circumstances, it often proves difficult to remove the expanded thermocouple for replacement.

SUMMARY OF THE INVENTION

It is a major object of the present invention to provide thermocouple apparatus that permit a thermocouple to be quickly and easily adjusted with respect to the burner upon which it is mounted, and yet which permits a defective thermocouple to be readily replaced even where such thermocouple hs become expanded with use.

It is a more particular object of the present invention to provide a thermocouple apparatus of the aforedescribed nature having an adaptor that includes a sleeve which houses a flexible spring clip, with the bore of the sleeve being sufficiently large that an expanded thermocouple may be withdrawn therefrom.

The thermocouple apparatus of the present invention may be used with several types of pilot burners and is additionally economical of manufacture.

Other objects and advantages of the present invention will become apparent from the following detailed description, when taken in conjunction with the accompanying drawings.

DESCRIPTION OF THE PREFERRED EMBODIMENT

Figures 1, 2, 3, 4:
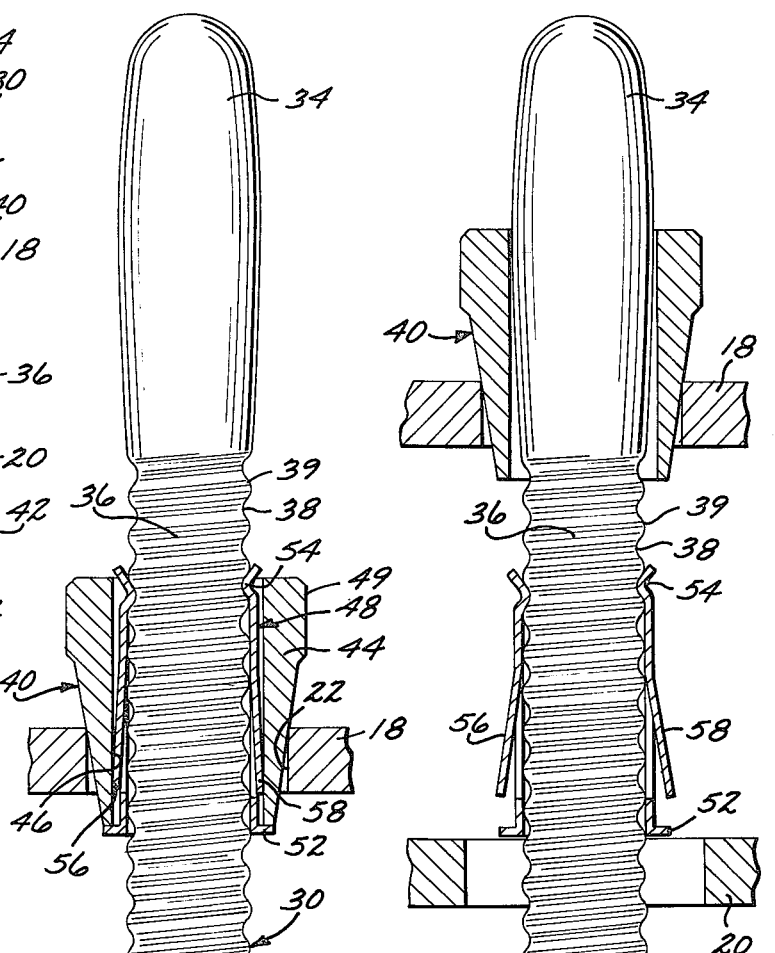
FIG. 1 is a side elevational view of a thermocouple-pilot burner assembly showing a thermocouple apparatus embodying the present invention.
FIG. 2 is a vertical sectional view taken in enlarged scale along line 2—2 of FIG. 1.
FIG. 3 is a view similar to FIG. 2, but showing the thermocouple being removed from the aforementioned burner assembly.
FIG. 4 is a vertically exploded perspective view of the upper adaptor member of said burner assembly.

Referring to the drawings, the thermocouple apparatus T of the present invention is shown in assembled relation with a conventional thermocouple-pilot assembly P. The thermocouple-pilot assembly P includes a pilot burner 10 supplied with a pilot flow of fuel by a conduit 12, as is well known in the art. The thermocouple-pilot assembly P also includes a mounting bracket, generally designated 14, having a vertical leg 16 which is attached to a main burner (not shown). Integrally connected with the vertical leg 16 are upper and lower horizontal arms 18 and 20, respectively. These arms 18 and 20 are formed with vertically aligned apertures 22 and 24, respectively, which receive a thermocouple body, generally designated 30. The lower end of the thermocouple body 30 is connected to a thermocouple tubing 32 for attachment to a suitable thermoelectric appliance (not shown), all as is well known in the art.

More particularly, the thermocouple body 30 is of elongated, generally cylindrical configuration having a smooth flame-engaging tip 34 below which is defined a mounting portion 36. Mounting portion 36 is formed with external circumferential grooves 38 that define ribs 39. The thermocouple body 30 is secured to the arms 18 and 20 of mounting bracket 14 by upper and lower adaptors, generally designated 40 and 42, respectively.

Upper adaptor 40 includes a sleeve 44 within the bore 46 of which is disposed a sleeve-shaped spring clip, generally designated 48. Sleeve 44 includes an upper knurled collar 49, with the exterior of the sleeve tapering downwardly and radially inwardly from the bottom of such collar.

The clip 48 may be of the type manufactured by Tinnerman Products, Inc. of Cleveland, Ohio and identified by the reference numeral 39 in U.S. Pat. No. 3,290,178 issued Dec. 6, 1966. Clip 48 consists of a piece of resilient sheet metal formed substantially into the shape of a tube or sleeve except for a slight space 50 between the opposite side edges of the sheet metal, with the lower end thereof flared outwardly to form an abutment flange 52. The upper surface of flange 52 normally abuts the lower end of sleeve 44, as shown in FIG. 2. An inwardly struck annular detent 54 is formed near the upper end thereof. Two diametrically opposed outwardly and downwardly extending and bent arms 56 and 58 are formed by cutting them on their two sides and across their bottoms from the sidewalls of the clip 48. The lower portions of these arms frictionally engage the lower portion of sleeve bore 46. The detent 54 frictionally engages grooves 38.

The lower adaptor 42 may be of the type described in detail in copending U.S. Pat application Ser. No. 419,225 filed Nov. 26, 1973. Alternatively, a lower adaptor of the type shown in U.S. Pat No. 3,522,107, issued July 28, 1970 may be employed. The bottom adaptor 42 shown in FIGS. 1, 2, and 3 includes a cylindrical body 60 formed with a vertical bore 62 of larger diameter than that of the thermocouple body 30. A sleeve-shaped spring clip 48a similar to the aforedescribed spring clip 48 but inverted relative to clip 48 is secured within bore 62, by the abutment of its lower flange 52a and the lower end of its arms 56a and 58a with a radially inwardly extending neck 64 of body 60. The detent 54a of spring clip 48a frictionally engages the grooves 38 of thermocouple mounting portion 36.

In the use of the aforedescribed thermocouple apparatus, the lower adaptor 42 is first slipped downwardly over the top of the thermocouple body 30 to the lower portion thereof. Thermocouple body 30 is then moved upwardly through the bracket mounting arms 18 and 20 from the underside of lower arm 20 until the upper end of body 60 enters bore 24 and a tapered shoulder 66 thereon abuts the underside of lower arm 20 at the periphery of such bore. Thermocouple body 30 is then axially adjusted relative to the lower adaptor 42 so that the thermocouple tip 34 will be located in the flame issuing from the pilot burner 10. The vertical adjustment of the thermocouple body relative to the lower adaptor 42 is permitted by the frictional engagement of the detent 54a of spring clip 48a with the ribs 39 of the thermocouple mounting portion 36. Thereafter, the upper adaptor 40 is slid downwardly over the thermocouple body 30 into the aperture 22 of the mounting bracket upper arm 18. The tapered configuration of the upper adaptor sleeve 44 permits such sleeve to be utilized with apertures 22 of varying diameters as are encountered with different types of pilot burner mounting brackets. The engagement of the detent 52 of spring clip 48 with the ribs 39 of thermocouple mounting portion 36 centers the upper portion of the thermocouple body 30 relative to aperture 22 and in cooperation with lever adaptor 42 stabilizes such body relative to mounting bracket 14.

Referring now to FIG. 3, assuming that thermocouple body 30 becomes defective, it is necessary to replace such thermocouple. This is readily effected by merely withdrawing the thermocouple body 30 downwardly through the apertures 22 and 24 of the mounting bracket arms 18 and 20. During such downward movement, the spring clip 48 of the upper adaptor 40 will be withdrawn from sleeve 44 because of the engagement of the spring detent 52 with the ribs 39. It should be noted that the frictional resistance of the spring clip arms 56 and 58 relative to the bore 46 of adaptor sleeve 44 is not sufficient to overcome the force of the frictional engagement between detent 52 and ribs 39. As indicated in FIG. 3, the withdrawal of the thermocouple body 30 through the upper adaptor 40 may take place even where the thermocouple tip 34 has expanded with use because the diameter of sleeve bore 46 is designed to be greater than the diameter of the expanded thermocouple tip.

Various modifications and changes may be made with respect to the foregoing detailed description without departing from the spirit of the present invention.

What is claimed is:

1. Thermocouple apparatus for use with a burner having a mounting bracket formed with aligned upper and lower apertures, said thermocouple apparatus comprising:
    an elongated thermocouple body of generally cylindrical configuration and including a mounting portion, said body being received by the apertures of said bracket;
    an upper adaptor having a sleeve that tapers downwardly toward said lower aperture and radially and is formed with a bore that receives the body of said thermocouple, with the exterior surface of said sleeve telescopically engaging the upper aperture of said mounting bracket;
    a tapered frusto-conical flexible spring clip that is openable circumferentially and has its larger end removeably engaged with the underside of said sleeve and its smaller end frictionally engaged with the mounting portion of said thermocouple; and
    with the frictional resistance between the smaller end of said spring clip and the mounting portion of said thermocouple body being greater than the frictional resistance between said spring clip and said sleeve whereby as said thermocouple body is withdrawn downwardly through said sleeve said sleeve remains engaged with said bracket, while said spring remains attached to and is removed with said body.

2. Thermocouple apparatus as set forth in claim 1 wherein:
    the mounting portion of said thermocouple body is formed with external axially spaced grooves and the smaller end of said spring is formed with a detent that frictionally engages said grooves.

* * * * *